(12) United States Patent
Kim

(10) Patent No.: US 7,170,565 B2
(45) Date of Patent: Jan. 30, 2007

(54) AUTOMATIC BRIGHTNESS STABILIZATION APPARATUS AND METHOD OF IMAGE DISPLAY DEVICE

(75) Inventor: Jae-cheol Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 537 days.

(21) Appl. No.: 10/768,649

(22) Filed: Feb. 2, 2004

(65) Prior Publication Data

US 2004/0263692 A1    Dec. 30, 2004

(30) Foreign Application Priority Data

Jun. 25, 2003    (KR) .................. 10-2003-0041442

(51) Int. Cl.
*H04N 5/21* (2006.01)
(52) U.S. Cl. ..................... 348/626; 348/687
(58) Field of Classification Search ............ 348/626, 348/625, 687, 678, 606; 315/370, 383, 384
See application file for complete search history.

(56) References Cited

U.S. PATENT DOCUMENTS

| | | | | |
|---|---|---|---|---|
| 4,185,301 A | * | 1/1980 | Mitsuda et al. | 348/626 |
| 5,072,300 A | * | 12/1991 | Anderson | 348/626 |
| 5,420,645 A | * | 5/1995 | Traa et al. | 348/626 |
| 5,528,312 A | * | 6/1996 | No et al. | 348/626 |
| 6,870,575 B2 | * | 3/2005 | Hibi et al. | 348/625 |
| 2002/0067436 A1 | * | 6/2002 | Shirahama et al. | 348/725 |

FOREIGN PATENT DOCUMENTS

KR    1998-0026019 A    7/1998

* cited by examiner

*Primary Examiner*—Victor R. Kostak
(74) *Attorney, Agent, or Firm*—Sughrue Mion, PLLC

(57) ABSTRACT

Provided is an automatic brightness stabilization (ABS) apparatus that prevents brightness stabilization from being affected by dynamic focus device and velocity modulation device. ABS apparatus includes an image signal processing portion which inserts a predetermined pulse signal into a vertical flyback period of an image signal and applies the resulting signal to the electron gun, an ABS signal detecting portion which detects the pulse signal affected by the electron gun, a velocity modulating portion which generates a velocity modulation signal for emphasizing luminance components of the image signal and applies the velocity modulation signal to a velocity modulation coil of the CRT, and a retrace cancelling portion which cancels the velocity modulation signal generated by the velocity modulating portion, during a vertical flyback period. Image signal processing portion compares the detected pulse signal with a predetermined amplitude of the pulse signal and controls the amplification degree of the image signal.

16 Claims, 4 Drawing Sheets

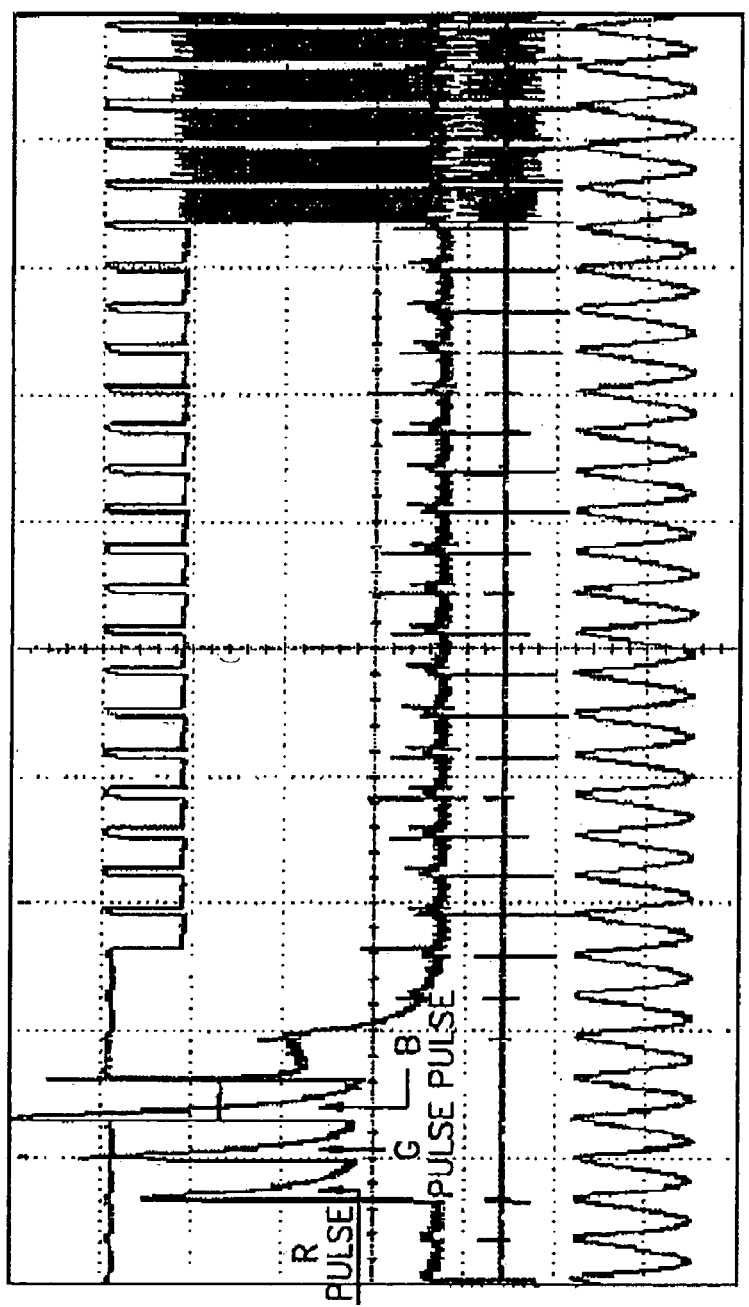

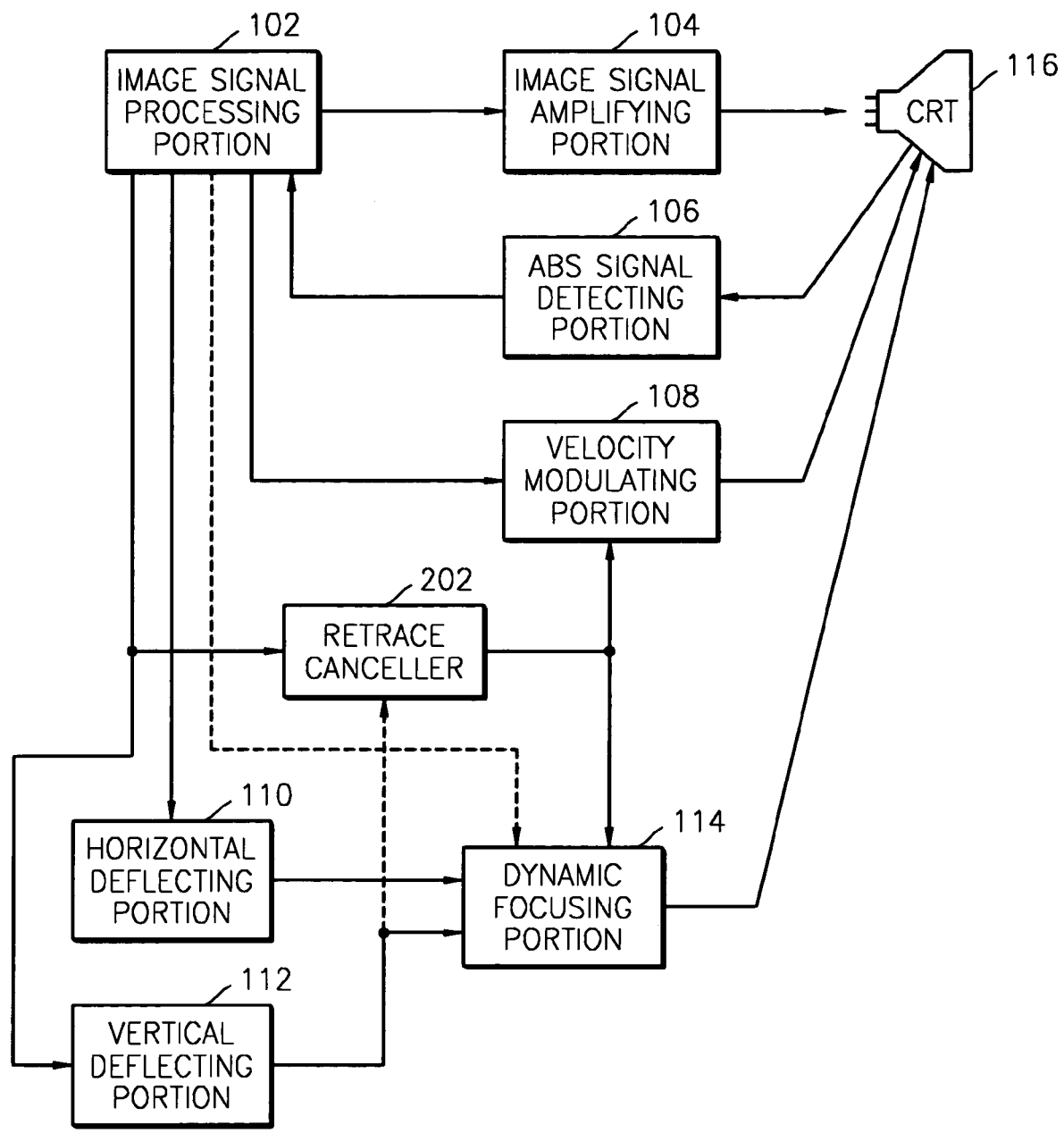

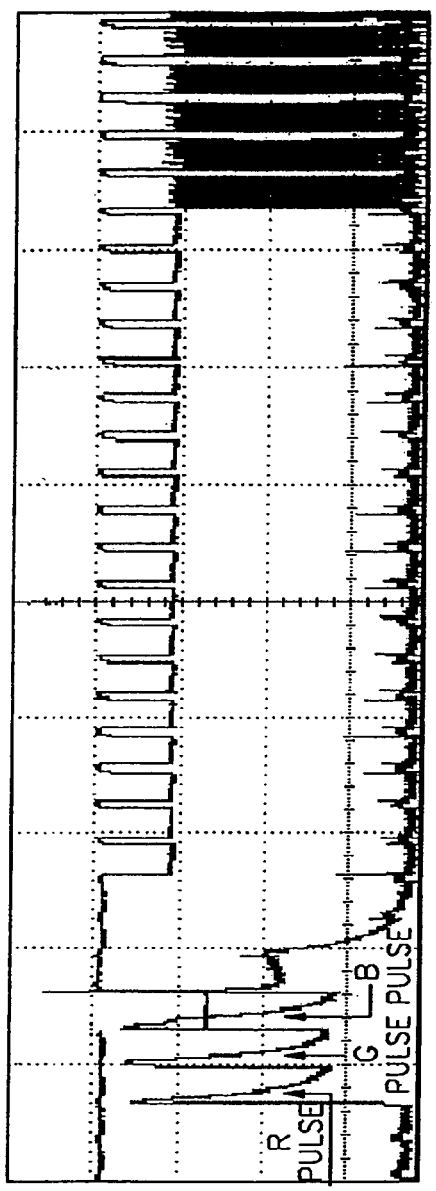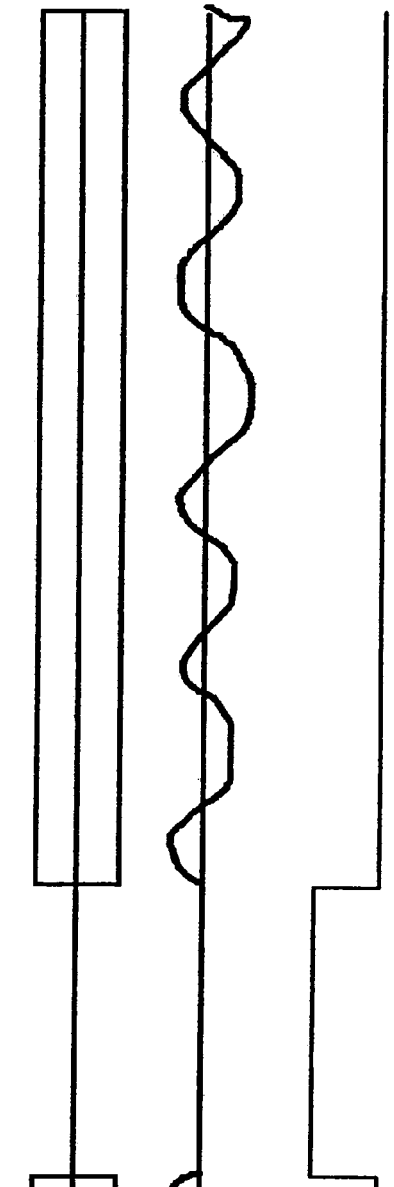
FIG. 4A IMAGE SIGNAL
FIG. 4B ABS SIGNAL
FIG. 4C VELOCITY MODULATION SIGNAL
FIG. 4D DYNAMIC FOCUS SIGNAL
FIG. 4E CANCEL SIGNAL

AUTOMATIC BRIGHTNESS STABILIZATION APPARATUS AND METHOD OF IMAGE DISPLAY DEVICE

CROSS REFERENCE TO RELATED APPLICATION

This application claims the priority of Korean Patent Application No. 2003-41442, filed on Jun. 25, 2003, in the Korean Intellectual Property Office, the disclosure of which is hereby incorporated by reference in its entirety.

BACKGROUND OF THE INVENTION

1. Field of the Invention

Apparatuses and methods consistent with the present invention relate to an automatic brightness stabilization (ABS) apparatus that minimizes color shifts caused by degradation of an electron gun in an image display device that adopts a cathode ray tube (CRT), and more particularly, to an ABS apparatus that prevents brightness stabilization from being affected by a dynamic focus device and a velocity modulation device.

2. Description of the Related Art

An ABS circuit is designed to minimize color shifts caused by degradation in an electron gun. A conventional ABS circuit inserts a pulse signal of a given level into a flyback period of an image signal applied to the electron gun of a CRT. By comparing a level of a pulse signal affected by the operation of the electron gun with a normal level of the pulse signal (when the electron gun is not degraded), the conventional ABS circuit determines the degree of degradation in the electron gun and then changes the amplification degree of the image signal applied to the electron gun according to the determined degree of degradation in the electron gun. In this way, the conventional ABS circuit minimizes color shifts even when the electron gun is degraded.

In image display devices, a velocity modulation circuit for compensating for the edges of an image signal is used along with a dynamic focus circuit for compensating for focus shifts in and around the middle of a screen.

At the edges of a luminance signal, the velocity modulation circuit applies a velocity modulation signal to a velocity modulation coil mounted in the CRT and controls a scanning velocity of beam generated in the electron gun, thus emphasizing the edges of the image signal. The dynamic focus circuit applies a horizontal parabola signal to a horizontal deflection signal and applies a vertical parabola signal to a vertical deflection signal, thereby compensating for focus shifts in and around the middle of the screen.

In a typical CRT, a dynamic focus signal and the velocity modulation signal have voltages of at least 100V while the image signal applied to the electron gun has a voltage of at most several volts.

As a result, noise components caused by the dynamic focus signal and by the velocity modulation signal are mixed with the pulse signal detected for automatic brightness stabilization, causing instability of brightness stabilization.

SUMMARY OF THE INVENTION

The present invention provides an automatic brightness stabilization (ABS) apparatus that prevents brightness stabilization from being affected by dynamic focusing and velocity modulation.

According to an aspect of the present invention, there is provided an automatic brightness stabilization (ABS) apparatus that minimizes color shifts caused by degradation in an electron gun of a cathode ray tube (CRT). The ABS apparatus comprises an image signal processing portion, an ABS signal detecting portion, a velocity modulating portion, and a retrace cancelling portion. The image signal processing portion inserts a predetermined pulse signal into a vertical flyback period of an image signal and applies the resulting signal to the electron gun. The ABS signal detecting portion detects the pulse signal affected by the electron gun. The velocity modulating portion generates a velocity modulation signal for emphasizing luminance components of the image signal and applies the velocity modulation signal to a velocity modulation coil of the CRT. The retrace cancelling portion generates a cancel signal for cancelling the velocity modulation signal generated by the velocity modulating portion, during the vertical flyback period. The image signal processing portion compares the amplitude of the pulse signal detected by the ABS signal detecting portion with the amplitude of the pulse signal when the electron gun is not degraded and controls the amplification degree of the image signal according to a comparison result.

The ABS apparatus also comprises a dynamic focus signal generating portion. The dynamic focus signal generating portion generates a dynamic focus signal for compensating for focus shifts of beam, which is generated by the electron gun, in and around the middle of a screen, wherein the dynamic focus signal generating portion cancels the dynamic focus signal in response to the cancel signal.

Further, an aspect of the invention are methods for effecting the above.

BRIEF DESCRIPTION OF THE DRAWINGS

The above and other aspects and advantages of the present invention will become more apparent by describing in detail an exemplary embodiment thereof with reference to the attached drawings in which:

FIGS. 2A through 2D are waveforms for schematically showing the effects of a velocity modulation signal and a dynamic focus signal upon an automatic brightness stabilization (ABS) signal in the conventional image display device of FIG. 1;

FIG. 3 is a block diagram of an image display device including an ABS apparatus according to the present invention; and FIGS. 4A through 4E are waveforms for schematically showing the operation of the ABS apparatus of FIG. 3.

DETAILED DESCRIPTION OF THE INVENTION

Figure 1:
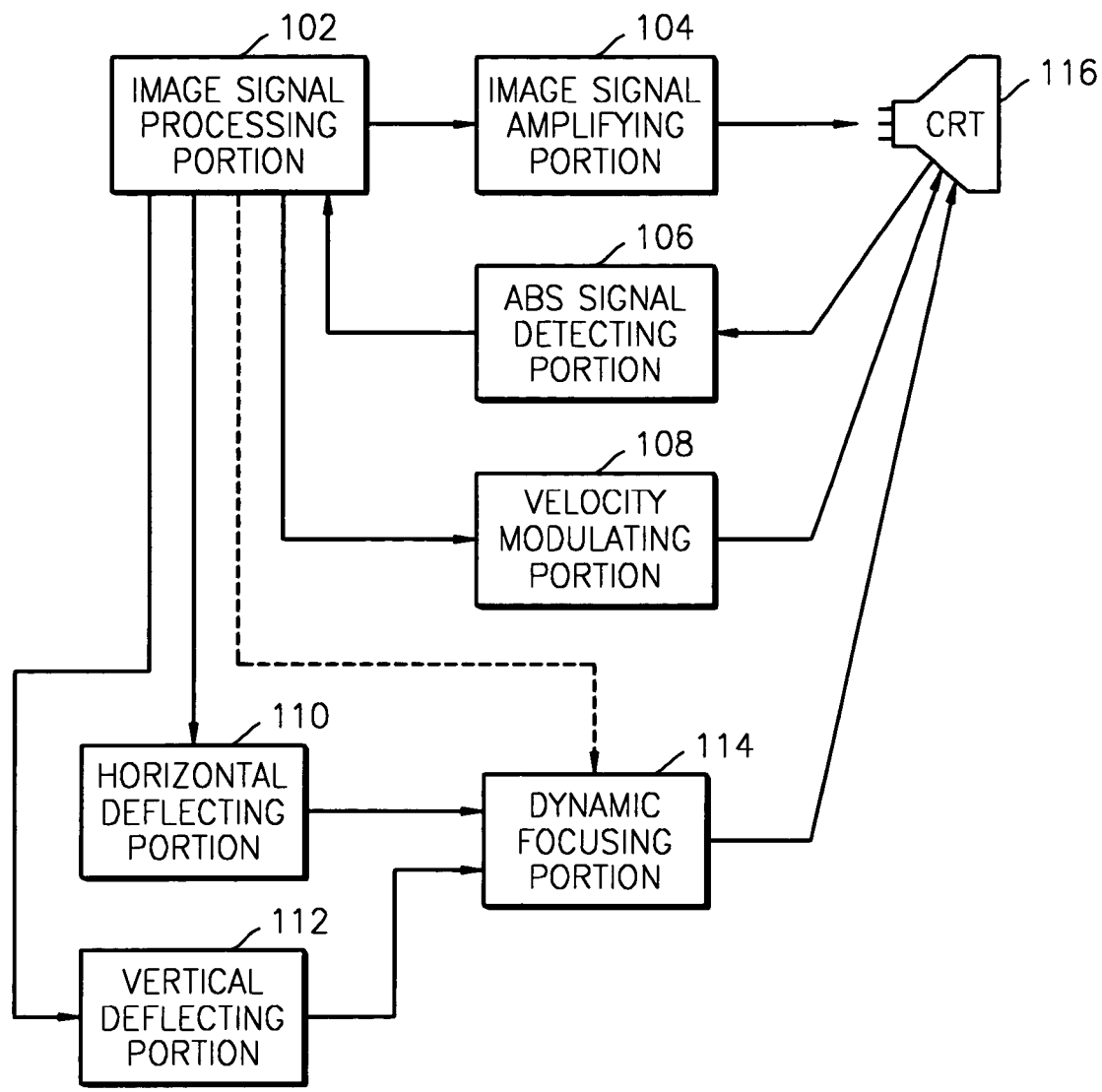
FIG. 1 is a block diagram of a conventional image display device.

The present invention will now be described more fully with reference to the accompanying drawings, in which an exemplary embodiment of the invention is shown. In the drawings, like reference numerals are used to refer to like elements throughout.

FIG. 1 is a block diagram of a conventional image display device. The conventional image display device includes an image signal processing portion 102, an image signal amplifying portion 104, an automatic brightness stabilization (ABS) signal detecting portion 106, a velocity modulating portion 108, a horizontal deflecting portion 110, a vertical deflecting portion 112, and a dynamic focusing portion 114.

The image signal processing portion 102 performs matrix processing for RGB image signals, i.e., controls a mixing ratio of the RGB image signals for proper color expression, then outputs the RGB image signals, and controls the amplification degree of the RGB image signals with reference to an output of the ABS signal detecting portion 106. At this time, a pulse signal of a given amplitude for automatic brightness stabilization is inserted into each of the RGB image signals. These pulse signals are inserted into vertical flyback periods, an R pulse signal is inserted into the 21st horizontal scanning period, a G pulse signal is inserted into the 22nd horizontal scanning period, and a B pulse signal is inserted into the 23rd horizontal scanning period (in accordance with National Television System Committee (NTSC)).

The image amplifying portion 104 amplifies the RGB image signals provided by the image signal processing portion 102 to amplitudes suitable for a cathode ray tube (CRT) 116 and provides the amplified RGB image signals to an R electron gun, a G electron gun, and a B electron gun, respectively.

The ABS signal detecting portion 106 detects levels of the pulse signals inserted into the vertical flyback periods from the RGB image signals that are provided to the CRT 116 from the image signal amplifying portion 104. More specifically, the ABS signal detecting portion 106 converts current components of the RGB image signals, provided to the CRT 116 from the image signal amplifying portion 104, into voltages, mixes theses voltages, performs low pass filtering on the mixing results using a frequency of a vertical retrace signal, and outputs the results.

When the CRT 116 is degraded, the resistances of the R, G, and B electron guns are changed. As a consequence, even when signals of the same amplitude are provided to the R, G, and B electron guns, currents are changed. The ABS signal detecting portion 106 detects the degree of degradation in the CRT 116 by detecting the current components of the provided RGB image signals.

The image signal processing portion 102 determines the degree of degradation in the CRT 116 by referring to levels of the pulse signals included in an ABS signal provided from the ABS signal detecting portion 106 and changes the amplification degree of the RGB image signals provided to the image signal amplifying portion 104. As a result, even when the electron guns are degraded, color shifts expressed by the CRT 116 can be minimized.

The velocity modulating portion 108 emphasizes the edges of an image signal by modulating the scanning velocity of beam at the edges of the image signal. More specifically, the velocity modulating portion 108 differentiates a luminance signal and changes the amplitude of a velocity modulation signal, which is applied to an auxiliary deflection coil (not shown) mounted in the CRT 116, according to the amplitude of differential components.

The dynamic focusing portion 114 generates a dynamic focus signal using a horizontal parabola signal and a vertical parabola signal and applies the dynamic focus signal to a focus electrode of the CRT 116.

FIGS. 2A through 2D are waveforms for schematically showing the effect of the velocity modulation signal and the dynamic focus signal upon the ABS signal in the conventional image display device of FIG. 1.

FIG. 2A shows one of the RGB image signals provided to the CRT 116. It can be seen from FIG. 2A that a pulse signal is inserted into the vertical flyback period of the RGB image signal. This pulse signal is used to determine the degree of degradation in the CRT 116 and has a given amplitude. A pulse signal for detecting a level of an R signal (hereinafter, referred to as an R pulse signal) is inserted into the 21st horizontal scanning period, a pulse signal for detecting a level of a G signal (hereinafter, referred to as a G pulse signal) is inserted into the 22nd horizontal scanning period, and a pulse signal for detecting a level of a B signal (hereinafter, referred to as a B pulse signal) is inserted into the 23rd horizontal scanning period (in accordance with National Television System Committee (NTSC)).

FIG. 2B shows the ABS signal output from the ABS signal detecting portion 106, where the R pulse signal, the B pulse signal, and the G pulse signal are shown in a left-to-right order. Here, ringing (a phenomenon wherein the slope of a signal decreases) occurs in the R pulse signal, the B pulse signal, and the G pulse signal because of interferences of adjacent electron guns.

To suppress the effect of such ringing, in practice, the average of levels of the R pulse signal, the B pulse signal, and the G pulse signal that are included in the ABS signal or a value sampled from the respective mid-levels of the R pulse signal, the B pulse signal, and the G pulse signal is used.

FIGS. 2C and 2D show the velocity modulation signal and the dynamic focus signal, respectively.

Referring to FIG. 2B, peaks of the R pulse signal, the G pulse signal, and the B pulse signal are different. This results from interceptions of the velocity modulation signal and the dynamic focus signal. Actually, the effects of the velocity modulation signal and the dynamic focus signal result in the slope of ringing and in high-frequency noises during ringing.

Typically, the level of the image signal that is applied to the electron gun of the CRT 116 is 5V at the maximum, while levels of the velocity signal and the dynamic focus signal are 100V at the minimum. Thus, the electron gun is affected by the velocity modulation signal and the dynamic focus signal of high levels. As a result, the ABS signal is mixed with noises. Since the effects of the velocity modulation signal and the dynamic focus signal often change by nature, they make automatic brightness stabilization unstable.

The ABS apparatus according to the present invention removes the effects of the velocity modulation signal and the dynamic focus signal upon the ABS signal by cancelling the velocity modulation signal and the dynamic focus signal during the vertical flyback period where the ABS signal is obtained, thereby allowing stable automatic brightness stabilization.

Since the velocity modulation signal and the dynamic focus signal are cancelled only during the vertical flyback period, any problem is not caused while watching image signals.

FIG. 3 is a block diagram of an image display device including an ABS apparatus according to the present invention. In FIG. 3, elements performing identical operations to those of elements in FIG. 1 are represented by numerals identical to those used in FIG. 1 and detailed operations of such elements will not be described here.

The image display device of FIG. 3 further comprises a retrace canceller 202 in contrast to the image display device of FIG. 1. The retrace canceller 202 generates a cancel signal for restricting the operations of the velocity modulating portion 108 and the dynamic focusing portion 114, during the vertical flyback period.

The velocity modulating portion 108 does not generate the velocity modulation signal in response to the cancel signal. Also, the dynamic focus portion 110 does not generate the dynamic focus signal in response to the cancel signal.

FIGS. 4A through 4D are waveforms for schematically showing the operation of the ABS apparatus of FIG. 3.

FIG. 4A shows one of the RGB image signals provided to the CRT 116. FIG. 4B shows the ABS signal output from the ABS signal detecting portion 106. FIGS. 4C and 4D show the velocity modulation signal and the dynamic focus signal, respectively. FIG. 4E shows the cancel signal output from the retrace canceller 202 of FIG. 3.

As shown in FIGS. 4C and 4D, it can be seen that during generation of the cancel signal, i.e., during the vertical flyback period, the velocity modulation signal and the dynamic focus signal are cancelled. As a result, the ABS signal is stabilized as shown in FIG. 4B.

As described above, the ABS apparatus according to the present invention prevents the ABS signal from being affected by the velocity modulation signal and the dynamic focus signal by canceling the velocity modulation signal and the dynamic focus signal during detection of the pulse signal inserted into the image signal for automatic brightness stabilization, thereby stabilizing automatic brightness stabilization.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. An automatic brightness stabilization (ABS) apparatus that minimizes color shifts caused by degradation in an electron gun of a cathode ray tube (CRT), the ABS apparatus comprising:
   an image signal processing portion, which inserts a predetermined signal into a vertical flyback period of an image signal to generate a resulting signal, and applies the resulting signal to the electron gun as an applied resulting signal;
   an ABS signal detecting portion, which detects a component of the applied resulting signal affected by the electron gun;
   a velocity modulating portion, which generates a velocity modulation signal for emphasizing luminance components of the image signal and applies the velocity modulation signal to a velocity modulation coil of the CRT; and
   a retrace cancelling portion, which generates a cancel signal for cancelling the velocity modulation signal generated by the velocity modulating portion, during the vertical flyback period,
   wherein the image signal processing portion compares an amplitude of the component detected by the ABS signal detecting portion with a predetermined amplitude and controls an amplification degree of the image signal according to a comparison result.

2. The ABS apparatus of claim 1 further comprising a dynamic focus signal generating portion which generates a dynamic focus signal for compensating for focus shifts of a beam generated by the electron gun, in and around a middle of a screen, wherein the dynamic focus signal generating portion cancels the dynamic focus signal in response to the cancel signal.

3. The ABS apparatus of claim 1, wherein the predetermined signal is a predetermined pulse signal.

4. The ABS apparatus of claim 3, wherein the component of the applied resulting signal is a pulse signal.

5. The ABS apparatus of claim 4, wherein the predetermined amplitude is a predetermined amplitude of a pulse signal of the resulting signal applied to an undegraded electron gun.

6. The ABS apparatus of claim 5, wherein the undegraded electron gun has a resistance different from a resistance of a degraded electron gun.

7. A signal processing apparatus for minimizing effects of at least one of a velocity modulation signal and a dynamic focus signal on an image signal of a cathode ray tube (CRT) of an image device wherein an automatic brightness stabilization (ABS) signal detecting portion detects a component of an applied first signal applied to an electron gun, a velocity modulating portion generates the velocity modulation signal for emphasizing luminance components of the image signal and applies the velocity modulation signal to a velocity modulation coil of the CRT, the signal processing apparatus comprising:
   an image signal processing portion, which inserts a predetermined signal into a vertical flyback period of the image signal to generate a first signal, and applies the first signal to the electron gun as the applied first signal,
   a retrace cancelling portion, which generates a cancel signal for cancelling the velocity modulation signal generated by the velocity modulating portion, during the vertical flyback period,
   wherein the image signal processing portion compares an amplitude of the component detected by the ABS signal detecting portion with a predetermined amplitude and controls an amplification degree of the image signal according to a comparison result.

8. The signal processing apparatus of claim 7 further comprising a dynamic focus signal generating portion which generates the dynamic focus signal for compensating for focus shifts of a beam generated by the electron gun, in and around a middle of a screen, wherein the dynamic focus signal generating portion cancels the dynamic focus signal in response to the cancel signal.

9. The signal processing apparatus of claim 8, wherein the predetermined signal is a predetermined pulse signal.

10. The signal processing apparatus of claim 9, wherein the component of the applied resulting signal is a pulse signal.

11. The signal processing apparatus of claim 10, wherein the predetermined amplitude is a predetermined amplitude of a pulse signal of the resulting signal applied to an undegraded electron gun.

12. The signal processing apparatus of claim 11, wherein the undegraded electron gun has a resistance different from a resistance of a degraded electron gun.

13. A method for minimizing effects of at least one of a velocity modulation signal and a dynamic focus signal on an automatic brightness stabilization (ABS) signal of a cathode ray tube (CRT) device, the method comprising:
   canceling the velocity modulation signal during a vertical flyback period.

14. The method of claim 13, wherein the step of canceling the velocity modulation signal comprises generating a cancel signal, outputting the cancel signal to a velocity modulation portion, and substantially reducing the velocity modulation signal.

15. The method of claim 13 further comprising canceling the dynamic focus signal during the vertical flyback period.

16. The method of claim 15, wherein the step of canceling the dynamic focus signal comprises generating a cancel signal, outputting the cancel signal to a dynamic focusing portion, and substantially reducing the dynamic focus signal.

* * * * *